(12) United States Patent
Ota

(10) Patent No.: US 12,540,242 B2
(45) Date of Patent: Feb. 3, 2026

(54) EPOXY RESIN COMPOSITION, CURED PRODUCT, AND ELECTRICAL OR ELECTRONIC COMPONENT

(71) Applicant: Mitsubishi Chemical Corporation, Tokyo (JP)

(72) Inventor: Kazumasa Ota, Tokyo (JP)

(73) Assignee: Mitsubishi Chemical Corporation, Tokyo (JP)

( * ) Notice: Subject to any disclaimer, the term of this patent is extended or adjusted under 35 U.S.C. 154(b) by 1048 days.

(21) Appl. No.: 17/582,053

(22) Filed: Jan. 24, 2022

(65) Prior Publication Data

US 2022/0145067 A1 May 12, 2022

Related U.S. Application Data

(63) Continuation of application No. PCT/JP2020/030424, filed on Aug. 7, 2020.

(30) Foreign Application Priority Data

Aug. 22, 2019 (JP) .................................. 2019-152125

(51) Int. Cl.
C08L 63/00 (2006.01)

(52) U.S. Cl.
CPC ......... *C08L 63/00* (2013.01); *C08L 2205/025* (2013.01); *C08L 2205/03* (2013.01)

(58) Field of Classification Search
CPC .... C08G 59/14; C08G 59/1405; C08G 59/20; C08G 59/226; C08G 59/245; C08G 65/226; C08L 63/00; C08L 63/04; C08L 63/08; C08L 63/01
See application file for complete search history.

(56) References Cited

U.S. PATENT DOCUMENTS

| | | | |
|---|---|---|---|
| 2003/0098649 A1 | 5/2003 | Murai et al. | |
| 2006/0194063 A1 | 8/2006 | Murai et al. | |
| 2007/0149793 A1 | 6/2007 | Arndt et al. | |

FOREIGN PATENT DOCUMENTS

| | | |
|---|---|---|
| JP | 11-269159 A | 10/1999 |
| JP | 2002-097251 A | 4/2002 |
| JP | 2003-26763 A | 1/2003 |
| JP | 2003-212955 A | 7/2003 |
| JP | 2005-120357 A | 5/2005 |

(Continued)

OTHER PUBLICATIONS

Japanese Office Action issued Feb. 6, 2024 in Japanese Application 2021-540731, (with unedited computer-generated English translation), 7 pages.

(Continued)

*Primary Examiner* — Jeffrey S Lenihan
(74) *Attorney, Agent, or Firm* — Oblon, McClelland, Maier & Neustadt, L.L.P.

(57) ABSTRACT

An epoxy resin composition (A), containing an epoxy resin having a structure represented by formula (1) described below and an epoxy resin having a structure represented by formula (2) described below and/or an epoxy resin having a structure represented by formula (3) described below. 89.0% to 99.9% by mass of the epoxy resin (1) and 0.1% to 11.0% by mass of the epoxy resin (2) and/or the epoxy resin (3) are contained in 100% by mass of a total of the epoxy resin (1) and the epoxy resin (2) and/or the epoxy resin (3).

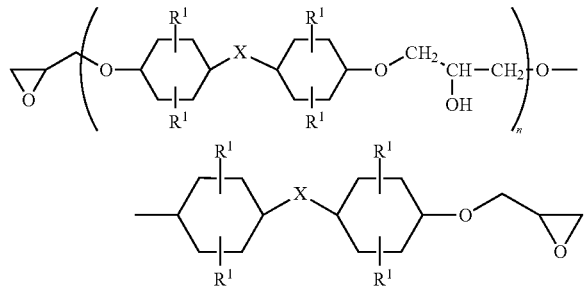

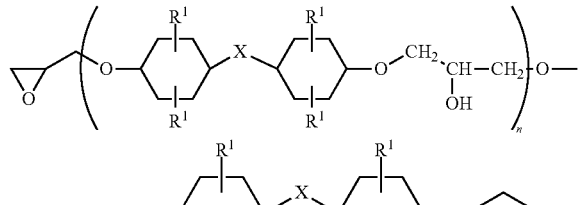

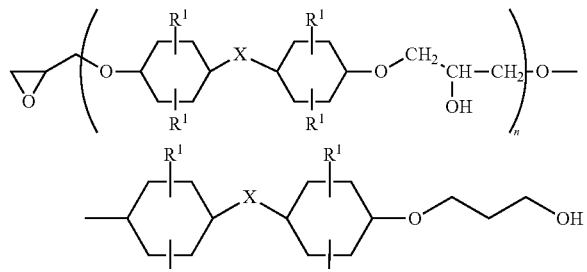

8 Claims, No Drawings

(56) References Cited

FOREIGN PATENT DOCUMENTS

JP      2007-2017 A      1/2007
JP      2007-515276 A    6/2007

OTHER PUBLICATIONS

Combined Chinese Office Action and Search Report issued Feb. 28, 2024 in Chinese Application 202080052013.7, (with unedited computer-generated English translation), 12 pages.
Extended European Search Report issued Sep. 13, 2022, in corresponding European Patent Application No. 20854452.8, 6 pages.
Taiwanese Decision of Refusal issued Jun. 3, 2024 in Taiwanese Application No. 109128330 with English Machine translation, 13 pgs.
International Search Report issued Oct. 20, 2020 in PCT/JP2020/030424 filed on Aug. 7, 2020, 2 pages.
Combined Taiwanese Office Action and Search Report issued Dec. 27, 2023 in Taiwanese Patent Application No. 109128330 (with English machine translation), 15 pages.
Korean Office Action issued May 7, 2025 in Korean Patent Application No. 10-2022-7001217 (with unedited computer-generated English translation), 11 pages.

EPOXY RESIN COMPOSITION, CURED PRODUCT, AND ELECTRICAL OR ELECTRONIC COMPONENT

TECHNICAL FIELD

The present invention relates to an epoxy resin composition, a cured product, and an electrical or electronic component. More particularly, the present invention relates to an epoxy resin composition (A) having superior electrical properties and optical properties, an epoxy resin composition (B) containing the epoxy resin composition (A) and a curing agent and having superior curability, and a cured product and an electrical or electronic component that are produced by curing the epoxy resin composition and that have superior crack resistance and heat resistance.

BACKGROUND ART

Epoxy resins have been used in a wide range of fields, such as adhesives, paints, and electrical and electronic materials, because they are cured with various curing agents into cured products that typically have, for example, superior mechanical properties, heat resistance, and electrical properties. In particular, hydrogenated bisphenol-type epoxy resins, in which hydrogen is added to aromatic epoxy resins, have been widely used in the optical field.

PTL 1 describes a method for producing a glycidyl group-containing alicyclic compound having a low chlorine content in the presence of an ether group-containing alcohol, and a low-viscosity epoxy resin composition containing the glycidyl group-containing alicyclic compound and having superior electrical insulation and weather resistance.

PTL 2 discloses a method for producing a hydrogenated bisphenol-type epoxy resin by ring hydrogenation of a bisphenol A-type epoxy resin and a bisphenol F-type epoxy resin in the presence of a heterogeneous ruthenium catalyst containing a specific silicon dioxide support.

PTL 3 describes a method for producing an alicyclic epoxy compound having an improved hue by selectively hydrogenating the aromatic ring of an aromatic epoxy compound in the presence of a hydrogenation catalyst and conducting a reaction in the presence of a reaction solvent having an ester solvent content of 50% by mass.

PTL 1: JP2002-97251A
PTL 2: JP2007-515276A
PTL 3: JP2003-212955A

With the recent rapid development of the electronics industry, optical materials have been increasingly required to have high levels of electrical properties, optical properties, curability, crack resistance, and heat resistance.

The hydrogenated bisphenol epoxy resins described in PTLs 1 to 3 are insufficient in terms of optical properties, such as transparency, curability when cured, and crack resistance and heat resistance as a cured product.

SUMMARY OF INVENTION

The present invention aims to provide an epoxy resin composition (A) having superior electrical properties and optical properties, an epoxy resin composition (B) containing the epoxy resin composition (A) and having superior curability, a cured product and an electrical or electronic component that are produced by curing the epoxy resin composition (B) and that have superior crack resistance and heat resistance.

The inventor has found that the epoxy resin composition (A) having a specific composition and the epoxy resin composition (B) containing the epoxy resin composition (A) and a curing agent solve the above problems, leading to the completion of the invention.

The gist of the present invention lies in the following [1] to [9].

[1] An epoxy resin composition (A), comprising an epoxy resin having a structure represented by formula (1) described below (hereinafter, referred to as an "epoxy resin (1)") and an epoxy resin having a structure represented by formula (2) described below (hereinafter, referred to as an "epoxy resin (2)") and/or an epoxy resin having a structure represented by formula (3) described below (hereinafter, referred to as an "epoxy resin (3)"), 89.0% to 99.9% by mass of the epoxy resin (1) and 0.1% to 11.0% by mass of the epoxy resin (2) and/or the epoxy resin (3) being contained in 100% by mass of a total of the epoxy resin (1) and the epoxy resin (2) and/or the epoxy resin (3),

[Chem. 1]

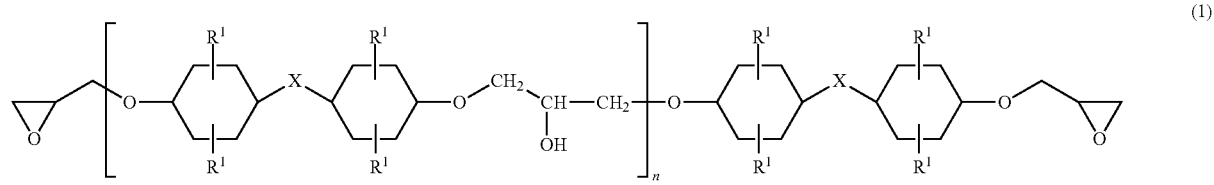

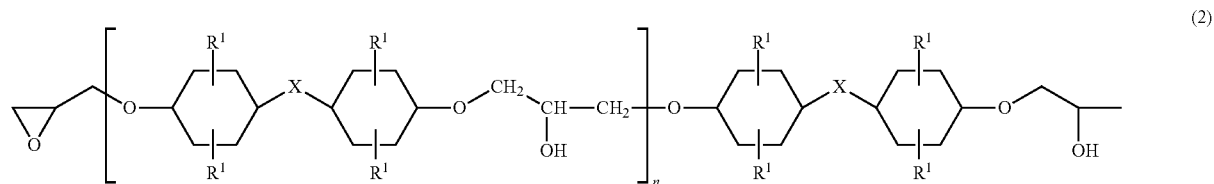

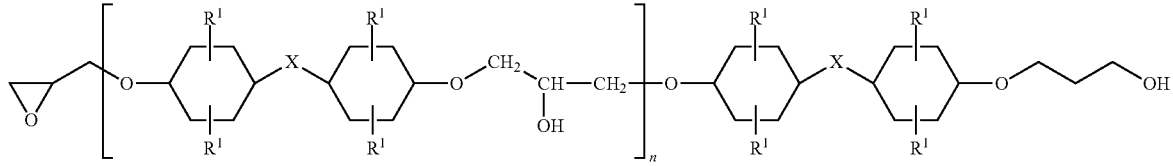

(3)

In the formulae (1), (2), and (3), each X is a direct bond or a divalent linking group selected from —SO$_2$—, —O—, —CO—, —C(CF$_3$)$_2$—, —S—, and a hydrocarbon group having 1 to 20 carbon atoms, R$^1$'s are each a hydrogen atom, a hydrocarbon group having 1 to 10 carbon atoms, or a halogen element and are optionally the same or different, two R$^1$'s bonded to two adjacent carbon atoms of one of cyclohexane rings are optionally taken together to form a ring structure having 4 to 20 carbon atoms, and n is an integer of 0 to 2.

[2] The epoxy resin composition (A) according to [1], wherein in formulae (1) to (3), each X is an isopropylidene group, each R$^1$ is a hydrogen atom, and n is 0.

[3] The epoxy resin composition (A) according to [1] or [2], wherein a total chlorine content (according to JIS K7043-3) is 1,000 ppm or less.

[4] The epoxy resin composition (A) according to any one of [1] to [3], wherein an epoxy equivalent is 176 to 186 g/equivalent.

[5] The epoxy resin composition (A) according to any one of [1] to [4], wherein a value of a Hazen color number (APHA value: according to ISO 6271-2:2004) is 12 or less.

[6] An epoxy resin composition (B), comprising 100 parts by mass of the epoxy resin composition (A) according to any one of [1] to [5] and 0.01 to 1,000 parts by mass of a curing agent.

[7] A cured product obtained by curing the epoxy resin composition (B) according to [6].

[8] An electrical or electronic component obtained by curing the epoxy resin composition (B) according to [6].

[9] An optical component obtained by curing the epoxy resin composition (B) according to [6].

Advantageous Effects of Invention

According to the present invention, it is possible to provide the epoxy resin composition (A) having superior electrical properties and optical properties, the epoxy resin composition (B) containing the epoxy resin composition (A) and having superior curability, the cured product and the electrical or electronic component that are produced by curing the epoxy resin composition (B) and that have superior crack resistance and heat resistance.

DESCRIPTION OF EMBODIMENTS

Embodiments of the present invention will be described in detail below. The following description is an example of an embodiment of the present invention. The present invention is not limited to the following description as long as it does not exceed the gist thereof.

When the expression "to" is used in the present specification, it shall be used as an expression including numerical values or physical property values before and after the expression.

[Epoxy Resin Composition (A)]

An epoxy resin composition (A) according to the present invention contains an epoxy resin having a structure represented by formula (1) described below (hereinafter, referred to as an "epoxy resin (1)", in some cases) and an epoxy resin having a structure represented by formula (2) described below (hereinafter, referred to as an "epoxy resin (2)", in some cases) and/or an epoxy resin having a structure represented by formula (3) described below (hereinafter, referred to as an "epoxy resin (3)", in some cases) and is characterized by containing 89.0% to 99.9% by mass of the epoxy resin (1) and 0.1% to 11.0% by mass of the epoxy resin (2) and/or the epoxy resin (3) in 100% by mass of the total of the epoxy resin (1) and the epoxy resin (2) and/or the epoxy resin (3).

Hereinafter, the proportion of the epoxy resin (1) in 100% by mass of the total of the epoxy resin (1) and the epoxy resin (2) and/or the epoxy resin (3) is sometimes referred to simply as "epoxy resin (1) content", and the proportion of the epoxy resin (2) and/or the epoxy resin (3) in 100% by mass of the total of the epoxy resin (1) and the epoxy resin (2) and/or the epoxy resin (3) is sometimes referred to simply as "epoxy resin (2)/(3) content".

[Chem. 2]

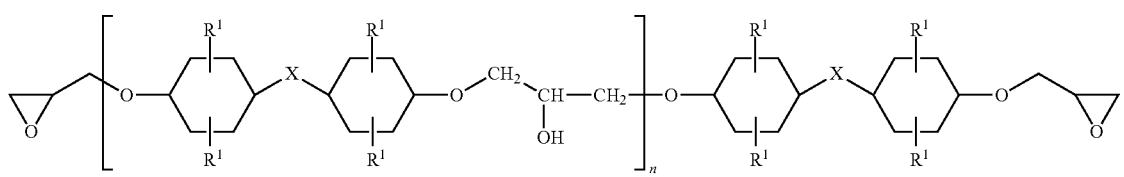

(1)

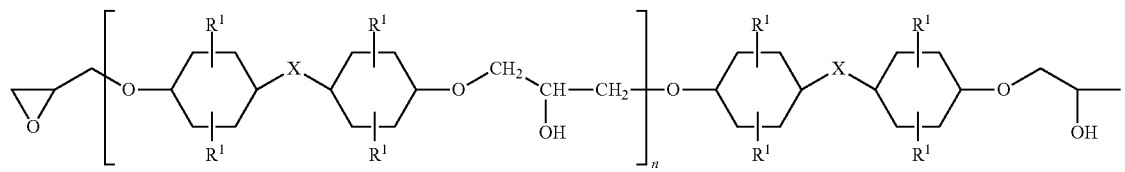

(2)

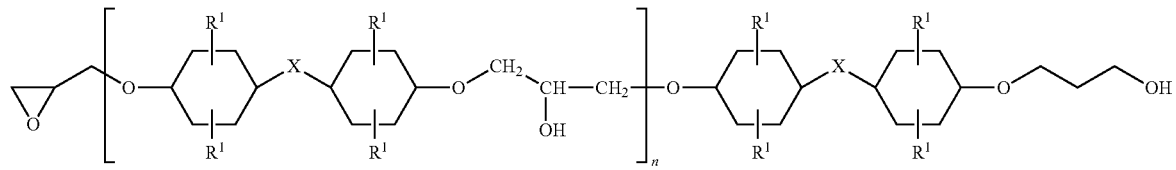

(3)

In the formulae (1), (2), and (3), each X is a direct bond or a divalent linking group selected from —$SO_2$—, —O—, —CO—, —$C(CF_3)_2$—, —S—, and a hydrocarbon group having 1 to 20 carbon atoms, $R^1$'s are each a hydrogen atom, a hydrocarbon group having 1 to 10 carbon atoms, or a halogen element and are optionally the same or different, two $R^1$'s bonded to two adjacent carbon atoms of one of cyclohexane rings are optionally taken together to form a ring structure having 4 to 20 carbon atoms, and n is an integer of 0 to 2.

The epoxy resin composition (A) of the present invention is defined as an "epoxy resin composition" because it contains multiple components, such as the epoxy resin (1) and the epoxy resin (2) and/or the epoxy resin (3). However, in the technical field of epoxy resins, an "epoxy resin" may also be obtained as a "composition" consisting of multiple components as well as those consisting of a single component. For this reason, the epoxy resin composition (A) of the present invention is sometimes described as an "epoxy resin" or sold as an "epoxy resin" in the art and in the market. In the art, an "epoxy compound (uncured)" is called an "epoxy resin".

In formulae (1) to (3) described above, each X is preferably a direct bond or a hydrocarbon group having 1 to 10 carbon atoms, more preferably a direct bond, a methylene group, or an isopropylidene group. Most preferably, each X is an isopropylidene group.

Each $R^1$ is preferably a hydrogen atom or a methyl group, most preferably a hydrogen atom.

In formulae (1) to (3) described above, n is preferably 0 to 1, most preferably 0. A larger n results in a larger molecular weight, increasing the viscosity and the softening temperature. This may lead to poor handleability.

Multiple $R^1$'s present in formula (1) may all be the same or different, and multiple X's present therein when n is 1 or more may be the same or different. However, they are preferably the same, because in the case of different compounds at the time of the distillation of the epoxy resin (1), a difficulty lies in the distillation operation due to different boiling points. The same is true for $R^1$'s and X's in formulae (2) and (3).

X's, $R^1$'s, and n's in formulae (1) to (3) may be the same or different among formulae (1) to (3). However, from the viewpoints of ease of adjustment of each component content in the epoxy resin composition (A) and ease of production, X's, $R^1$'s, and n's in the respective structural formulae are preferably the same among formulae (1) to (3).

[Composition of Epoxy Resin Composition (A)]

From the viewpoints of obtaining superior electrical properties and optical properties, superior curability as an epoxy resin composition (B), described below, containing a curing agent, and superior crack resistance and heat resistance, the epoxy resin composition (A) of the present invention is characterized by containing the epoxy resin (1) and the epoxy resin (2) and/or the epoxy resin (3), 89.0% to 99.9% by mass of the epoxy resin (1) and 0.1% to 11.0% by mass of the epoxy resin (2) and/or the epoxy resin (3) being contained in 100% by mass of the total of the epoxy resin (1) and the epoxy resin (2) and/or the epoxy resin (3). A higher epoxy resin (1) content and a lower epoxy resin (2) and/or epoxy resin (3) content tend to result in a lower Hazen color number of the epoxy resin composition (A). For the epoxy resin composition (B), an increase in crosslink density and a reduction in coefficient of linear expansion improve the crack resistance. In addition, the glass transition temperature is high, thus improving the heat resistance. A lower epoxy resin (1) content and a higher epoxy resin (2) and/or epoxy resin (3) content tend to result in deteriorations in crack resistance and heat resistance in the case of the epoxy resin composition (B).

From the viewpoint of more effectively obtaining the effect of the present invention by containing the epoxy resin (1) and the epoxy resin (2) and/or the epoxy resin (3), preferably, the epoxy resin (1) content is 90.0% to 99.0% by mass, and the epoxy resin (2) and/or epoxy resin (3) content is 1.0% to 10.0% by mass. More preferably, the epoxy resin (1) content is 92.0% to 98.0% by mass, and the epoxy resin (2) and/or epoxy resin (3) content is 2.0% to 8.0% by mass. Particularly preferably, the epoxy resin (1) content is 95.0% to 98.0% by mass, and the epoxy resin (2) and/or epoxy resin (3) content is 2.0% to 5.0% by mass.

In the epoxy resin composition (A) of the present invention, the proportion of the epoxy resin (2) and/or the epoxy resin (3) to the epoxy resin (1) is preferably 0.1% to 13% by mass, more preferably 1% to 12% by mass.

The epoxy resin (2) and the epoxy resin (3) have the same molecular weight and the same number of hydroxy groups; thus, it is difficult to distinguish between them and analyze their contents. For this reason, the term "epoxy resin (2) and/or epoxy resin (3)" is used in the present invention. The epoxy resin composition (A) of the present invention may contain only one of the epoxy resin (2) and the epoxy resin (3) or both of the epoxy resin (2) and the epoxy resin (3). In a method for producing the epoxy resin composition (A) described below, the epoxy resin composition (A) containing both of the epoxy resin (2) and the epoxy resin (3) is produced. It is difficult to separate the epoxy resin (2) from the epoxy resin (3) by, for example, purification. Thus, when the epoxy resin composition (A) is produced on an industrial scale, it is easier to analyze the "epoxy resin (2) and/or epoxy resin (3)" content than to analyze each of the epoxy resin (2) content and the epoxy resin (3) content of the epoxy resin composition (A).

The epoxy resin composition (A) of the present invention may usually contain other components other than the above epoxy resins (1) to (3).

The other components are chlorine impurities that are by-products in the reaction processes of formulae (1) to (3) formed in the production of the epoxy resin composition (A) of the present invention. The term "chlorine impurities" is a generic term for chlorine atom (Cl)-containing organic substances and compounds, such as compounds containing chlorine atoms in their structural formulae, that are by-products formed in the production of the epoxy resin composition (A).

The amounts of the other components contained in the epoxy resin composition (A) of the present invention are preferably 3% by mass or less, more preferably 2% by mass or less, even more preferably 1% by mass or less. When the amounts of the other components contained are large, the necessary amounts of epoxy resins (1) to (3) contained cannot be ensured, thus failing to sufficiently provide the effects of improving the electrical properties, the optical properties, the curability as an epoxy resin composition (B) the crack resistance, and the heat resistance.

When the epoxy resin composition (A) of the present invention contains the other components, the total of the epoxy resins (1) to (3) and the other components is 100% by mass.

The amounts of epoxy resins (1) to (3) and the other components contained in the epoxy resin composition (A) of the present invention can be measured, for example, by gel permeation chromatography analysis (hereinafter, referred to as "GPC analysis") under the following conditions.

Instrument: Tosoh HLC-8220L GPC
Detector: RI
Mobile phase: tetrahydrofuran (containing BHT)
Flow rate: 0.8 mL/min
Column: Tosoh TSKgel G2000Hxl+G1000Hxlx2
Colum temperature: 40° C.

[Epoxy Equivalent]

The epoxy resin composition (A) of the present invention preferably has an epoxy equivalent of 178 to 186 g/equivalent from the viewpoints of achieving superior curability as the epoxy resin composition (B) containing a curing agent, superior crack resistance, and heat resistance, more preferably 178 to 181 g/equivalent from the viewpoints of improving the above characteristics. The epoxy equivalent in the above specific range seemingly results in the superior characteristics described above.

The "epoxy equivalent" used in the present invention is defined as "the mass of an epoxy resin containing one equivalent of epoxy groups" and can be measured according to JIS K7236-1955.

[Hazen Color Number]

In the epoxy resin composition (A) of the present invention, from the viewpoint of obtaining superior optical properties as an epoxy resin, the Hazen color number is preferably 12 or less. From the viewpoint of further improving the optical properties, this value is more preferably 9 or less, particularly preferably 8 or less. The Hazen color number of less than or equal to the above upper limit seemingly results in superior optical properties. A smaller Hazen color number is more preferred, and the lower limit is not limited to a particular value.

In the present invention, the "Hazen color number" can be measured according to ISO 6271-2:2004.

[Total Chlorine Content]

In the epoxy resin composition (A) of the present invention, from the viewpoint of obtaining superior electrical reliability as an epoxy resin, the total chlorine content is preferably 1,000 ppm or less (ppm by mass). From the viewpoint of further enhancing electrical reliability, the total chlorine content is more preferably 750 ppm or less, particularly preferably 700 ppm or less. The total chlorine content of less than or equal to the above upper limit results in superior electrical properties, optical properties, curing properties as the epoxy resin composition (B) containing a curing agent, and a cured product having superior crack resistance and heat resistance. A lower total chlorine content is more preferred, and the lower limit is not limited to a particular value.

The "total chlorine content" is the amount of chlorine atoms (Cl) contained in the epoxy resin composition (A).

In the present invention, the "total chlorine content" can be measured according to JIS K7243-3.

[Method for Producing Epoxy Resin Composition (A)]

<Raw-Material Aromatic Epoxy Resin>

A method for producing the epoxy resin composition (A) of the present invention is not limited to a particular method. The production of the epoxy resin composition (A) of the present invention by conducting a hydrogenation reaction using an aromatic epoxy resin as a raw material is preferred because the epoxy resin composition (A) of the present invention can be efficiently produced.

An example of a preferred aromatic epoxy resin to be used as a raw material is an epoxy resin having a structure illustrated in formula (4) below (hereinafter, referred to as an "aromatic epoxy resin (4)").

[Chem. 3]

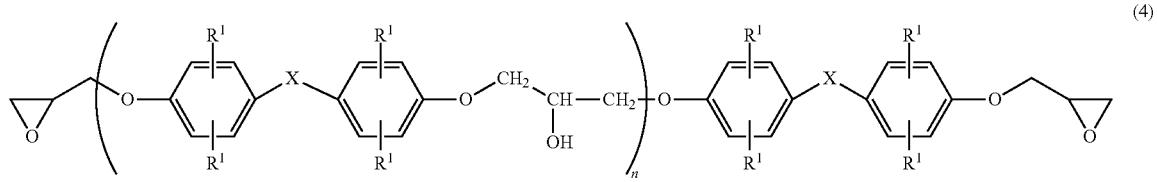

(4)

In formula (4) above, $R^1$'s, each X, and n are defined the same as in formulae (1) to (3).

Preferred specific examples of the aromatic epoxy resin (4) include bisphenol-type epoxy resins, such as bisphenol A-type epoxy resins, bisphenol F-type epoxy resins, 3,3',5,5'-tetramethyl-4,4'-biphenol-type epoxy resins, and 4,4'-biphenol-type epoxy resins; bisphenol A novolac-type epoxy resins; and naphthalenediol-type epoxy resins. Among these, bisphenol A-type epoxy resins are more preferred. These aromatic epoxy resins (4) may be used alone or in combination as a mixture of two or more.

Because it is suitable as a raw material before the hydrogenation reaction to efficiently obtain the epoxy resin composition (A) of the present invention, an aromatic epoxy resin with the following qualities is preferably used as the aromatic epoxy resin (4).

The epoxy equivalent of the aromatic epoxy resin (4) is preferably 165 to 194 g/equivalent, from the viewpoint of achieving the above-mentioned suitable range of the epoxy resin (1) content of the epoxy resin composition (A).

The total chlorine content of the aromatic epoxy resin (4) is preferably 2,000 ppm or less, particularly preferably 1,500 ppm or less, from the viewpoint of achieving a total chlorine content of the epoxy resin composition (A) of 1,000 ppm or less.

<Distillation of Aromatic Epoxy Resin>

The epoxy resin composition (A) of the present invention is preferably produced by performing the hydrogenation reaction of aromatic epoxy resin (4). The aromatic epoxy resin (4) is preferably distilled in advance before the aromatic epoxy resin (4) is subjected to the hydrogenation reaction because it is easy to control the proportions and amounts of epoxy resins (1) to (3) contained and even the total chlorine content of the epoxy resin composition (A).

In this case, the time for the distillation is preferably, but not particularly limited to, 5 to 30 hours, more preferably 6 to 15 hours.

The temperature and pressure during the distillation are not limited to particular values. The temperature is preferably 130° C. to 240° C., more preferably 210° C. to 230° C. An excessively high distillation temperature may cause decomposition of the aromatic epoxy resin (4). At a too low distillation temperature, a high degree of vacuum is required. This is not an industrially advantageous method.

The distillation pressure is preferably a reduced pressure of 0.001 to 1 Torr, and more preferably 0.001 to 0.01 Torr.

The distillation is preferably performed at a fraction of 70% or less, such as 40% to 60%. When the distillation is performed at a fraction of more than 70%, the oligomeric component of the aromatic epoxy resin (4) tends to increase to cause a difficulty in controlling the component contents of the epoxy resin composition (A) of the present invention within the above suitable ranges.

A distillation method is not limited to a particular method. Distillation is preferably performed with a thin-film distillation apparatus.

The physical properties of the aromatic epoxy resin (4) obtained by distillation are not particularly limited. The epoxy equivalent is preferably 165 to 180 g/equivalent because it is easy to control the epoxy resin (1) content of the epoxy resin composition (A) in the above-mentioned suitable range. The total chlorine content is preferably 1,500 ppm or less, particularly preferably 1,000 ppm or less.

<Hydrogenation Reaction>

A hydrogenation catalyst used in the hydrogenation reaction is preferably a catalyst containing an element of the platinum group as an active component. A rhodium catalyst or ruthenium catalyst is preferred. The hydrogenation catalyst is preferably a catalyst composed of the active component supported on a carbonaceous support. Examples of the carbonaceous support include activated carbon, graphite, and carbon black. Among these, activated carbon or high-surface-area graphite is particularly preferred. The carbonaceous support usually has a specific surface area of 5 to 3,000 m$^2$/g, preferably 50 to 1,500 m$^2$/g, and usually has a particle size of 5 to 500 μm.

As a method for preparing a hydrogenation catalyst, for example, a method described in JP11-217379A may be employed. The amount of a catalytic metal component mixed in the resulting epoxy resin composition (A) varies in accordance with a method for preparing a hydrogenation catalyst. The catalytic metal component can be removed in a purification process described below.

The hydrogenation reaction is preferably performed in the presence of a reaction solvent having an ester solvent content of 50% or more by mass from the viewpoint of achieving a good hue of the resulting epoxy resin composition (A).

Examples of the ester solvent include fatty esters, carbonates, and lactones. Fatty esters are particularly preferred. In view of handling, fatty esters having a boiling point in the range of 50° C. to 180° C. under normal pressure are preferred. Examples of such fatty esters include methyl acetate, ethyl acetate, propyl acetate, butyl acetate, amyl acetate, methyl propionate, propyl propionate, butyl propionate, methyl butyrate, ethyl butyrate, and methyl isovalerate. Among these, acetates and propionates are preferred. Specifically, ethyl acetate, propyl acetate, butyl acetate, and methyl propionate are preferred. Ethyl acetate is particularly preferred.

The ester solvent may be mixed with an ether solvent, an alcohol solvent, or a paraffin solvent, which is widely used in the conventional art. In this case, the proportion of the ester solvent is usually 50% or more by mass, preferably 90% or more by mass, of the mixed solvent. Preferably, an ether solvent is substantially not contained. Specifically, the ether solvent content is preferably 1% or less by mass.

The amount of the reaction solvent used is usually 0.05 to 10, preferably 0.1 to 3, as a mass ratio with respect to the raw-material aromatic epoxy resin (4). A too small amount of the reaction solvent typically results in poor hydrogen diffusion due to the high viscosity of the raw material, leading to a low reaction rate and low selectivity of the hydrogenation reaction. An excessively large amount of the reaction solvent results in low productivity and is economically disadvantageous.

The reaction temperature is usually 30° C. to 150° C., preferably 50° C. to 130° C. A too low reaction temperature results in a low reaction rate and requires a large amount of hydrogenation catalyst and a long time to complete the reaction. An excessively high reaction temperature results not only in an increase in side reactions, such as hydrogenolysis of epoxy groups, but also in an increase in the amount of elution of the catalytic metal component, leading to a deterioration in the quality of the resulting epoxy resin composition (A).

The reaction pressure is usually 1 to 30 MPa, preferably 3 to 15 MPa. A too low reaction pressure results in a low reaction rate and requires a large amount of the hydrogenation catalyst and a long time to complete the reaction. An excessively high reaction pressure requires a large-scale facility, which is economically disadvantageous.

As a reaction method, a liquid-phase suspension reaction or fixed-bed reaction can be used. In particular, the liquid-phase suspension reaction is preferred.

Hydrogen may be introduced by a circulation system or may be introduced in an amount corresponding to the consumption. Hydrogen can also be introduced and dispersed in the liquid. Hydrogen can also be absorbed by being entrained in the liquid from the gas phase by means of stirring or the like. The end point of the reaction can be determined by analysis using hydrogen absorption monitoring or sampling.

The degree of hydrogenation of the aromatic rings of the aromatic epoxy resin (4) is preferably 85% or higher. An even higher degree of hydrogenation can also be achieved.

After completion of the reaction, if necessary, the catalyst is separated from the reaction solution by, for example, filtration or centrifugation. Then the reaction solvent is removed by distillation to obtain a desired product. The removal of the reaction solvent by distillation is usually performed at 50° C. to 200° C., preferably 70° C. to 150° C., under reduced pressure. The residual amount of the reaction solvent is usually 1% or less by mass, preferably 0.2% or less by mass, from the viewpoint of the influence on the environment during use, particularly odor. The lower limit of the residual amount of the reaction solvent is usually 0.001% by mass. Further removal of the reaction solvent by distillation requires a long heating time and may reduce the stability of the resulting epoxy resin composition (A). The introduction of an inert gas, such as nitrogen, is effective in further reducing the residual amount of the reaction solvent.

The concentration of the catalytic metal component in the epoxy resin composition (A) obtained by the hydrogenation reaction is usually 0.01 to 50 ppm. The concentration of the catalytic metal component in the epoxy resin composition (A) can be reduced to such a low concentration by using an ester solvent as the solvent and by selecting conditions for the preparation of the catalyst used in the hydrogenation reaction and conditions for the hydrogenation reaction. To reliably further reduce the concentration of the catalytic metal component in the epoxy resin composition (A), it is more preferable to perform the purification process using the adsorbent described below.

<Purification Process>

Examples of the adsorbent used in the purification process include activated carbon, activated clay, ion-exchange resins, and synthetic adsorbents. Among these, activated carbon is preferred. The type of activated carbon is not limited to a particular type. Various types of activated carbon produced from various raw materials, such as coconut shell raw materials, wood raw materials, and coal raw materials, can be used. The specific surface area of the activated carbon is preferably in the range of 500 to 3,000 m²/g.

The active surface of the adsorbent can be acidic, neutral, or basic, preferably basic. Examples of the basic adsorbent include solid basic compounds, such as magnesium oxide, and basic ion-exchange resins.

The purification process may be performed by either a batch contact treatment with a powder adsorbent or a circulation treatment to a packed bed of a granular adsorbent. As the powder adsorbent, an adsorbent having an average particle size of 1 to 1,000 m is preferred. For the granular adsorbent, an adsorbent having an average particle size of 1 to 10 mm is preferred.

The amount of adsorbent used varies in accordance with the type of adsorbent, but is usually 0.01% to 100% by mass, preferably 0.1% to 20% by mass, more preferably 0.2% to 10% by mass with respect to the epoxy resin composition to be purified.

The temperature during the adsorption treatment is usually 0° C. to 100° C., preferably 10° C. to 80° C. The state of the adsorption treatment is preferably a state containing a solvent in terms of the workability, recovery rate, and adsorption efficiency. The type of solvent is not limited to a particular solvent as long as the epoxy resin is dissolved therein.

The above purification process is usually performed before the hydrogenation reaction solution is concentrated; thus, the reaction solvent is suitably used as it is as a solvent during the adsorption treatment. The solvent content is usually 5% to 80% by mass as a concentration in the solution to be subjected to adsorption treatment. A too small amount of solvent results in high viscosity of the treatment solution, leading to low adsorption efficiency.

The adsorption treatment can be performed by mixing the adsorbent with the reaction solution after the hydrogenation reaction without separating the hydrogenation catalyst, and then separating both the catalyst and adsorbent by solid-liquid separation. This method has the following advantages.

In other words, when the solid-liquid separation of the catalyst is performed without an adsorbent in the reaction solution after the hydrogenation reaction, the solid-liquid separation performance is deteriorated by the stickiness of organic substances attached to the catalyst surface. In contrast, when the solid-liquid separation of the catalyst is performed with the adsorbent (especially, activated carbon) according to the above method, good solid-liquid separation performance is achieved. Even in this method, the removal efficiency of the catalyst is almost the same. In the case of performing the solid-liquid separation of the catalyst along with the adsorbent, the amount of adsorbent used is preferably 1 to 30 times by mass the amount of catalyst.

The amounts of epoxy resins (1) to (3) components contained in the epoxy resin composition (A) of the present invention can be controlled by combining the requirements of the reaction conditions of the hydrogenation reaction described above.

[Epoxy Resin Composition (B)]

The epoxy resin composition (B) of the present invention contains at least the epoxy resin composition (A) of the present invention described above and a curing agent.

The epoxy resin composition (B) of the present invention can be mixed with, for example, other epoxy resins other than the epoxy resin composition (A) of the present invention (hereinafter, referred to simply as "other epoxy resins", in some cases), a curing accelerator, an inorganic filler, and a coupling agent, as appropriate.

The epoxy resin composition (B) of the present invention containing the epoxy resin composition (A) of the present invention has superior curing properties, such as curability, and gives a cured product that sufficiently satisfies the various properties required for various applications. The use of the epoxy resin composition (B) of the present invention having superior curability enables an improvement in productivity in various applications.

[Curing Agent]

The curing agent in the present invention refers to a substance that contributes to the cross-linking reaction and/or chain extension reaction between epoxy groups of the epoxy resin.

In the present invention, even what is usually called a "curing accelerator" is regarded as a curing agent if it is a substance that contributes to the cross-linking reaction and/or chain extension reaction between epoxy groups of the epoxy resin.

The curing agent content of the epoxy resin composition (B) of the present invention is preferably 0.1 to 1,000 parts by mass, more preferably 500 parts or less by mass, even more preferably 300 parts or less by mass, based on 100 parts by mass of the total epoxy resin component as a solid content.

In the present invention, the "solid content" refers to components excluding the solvent, and includes the solid epoxy resin, a semi-solid material, and a viscous liquid material.

The "total epoxy resin component" corresponds to the amount of epoxy resin contained in the epoxy resin composition (B) of the present invention. When the epoxy resin composition (B) of the present invention contains only the epoxy resin composition (A), the "total epoxy resin component" corresponds to the amount of epoxy resin in the epoxy resin composition (A). When the epoxy resin composition (B) of the present invention contains the epoxy resin composition (A) and other epoxy resins, the "total epoxy resin component" corresponds to the sum of the epoxy resin in the epoxy resin composition (A) and other epoxy resins.

The curing agent is not limited to any particular curing agent, and all those generally known as epoxy resin curing agents can be used. Examples thereof include phenolic curing agents, amine curing agents, such as aliphatic amines, polyether amines, alicyclic amines, and aromatic amines, acid anhydride curing agents, isocyanuric acid derivative curing agents, amide curing agents, tertiary amines, and imidazoles.

The epoxy resin composition (B) of the present invention containing an acid anhydride curing agent, an isocyanuric acid derivative curing agent, or a phenolic curing agent can have superior curability, crack resistance, and heat resistance. Thus, it is preferable to contain an acid anhydride curing agent, an isocyanuric acid derivative curing agent, or a phenolic curing agent as the curing agent.

From the viewpoint of heat resistance, it is preferable to contain an acid anhydride curing agent or an isocyanuric acid derivative curing agent.

The use of imidazole is also preferable from the viewpoint of allowing the curing reaction to proceed sufficiently and improving the heat resistance.

A single type of curing agent may be used alone, or two or more types may be used in combination. When two or more types of curing agents are used in combination, they may be pre-mixed to prepare a curing agent mixture before use, or each of the curing agents may be separately added and mixed simultaneously when the components of the epoxy resin composition (B) are mixed.

<Acid Anhydride Curing Agent>

Examples of the acid anhydride curing agent include acid anhydrides and modified acid anhydrides.

Examples of acid anhydrides include phthalic anhydride (phthalic acid anhydride), maleic anhydride, trimellitic anhydride (trimellitic acid anhydride), pyromellitic anhydride, benzophenonetetracarboxylic anhydride, dodecenylsuccinic anhydride, poly(adipic anhydride), poly(azelaic anhydride), poly(sebacic anhydride), poly(ethyloctadecanedioic anhydride), poly(hexadecanedioic anhydride), tetrahydrophthalic anhydride (tetrahydrophthalic acid anhydride), methyltetrahydrophthalic anhydride (methyltetrahydrophthalic acid anhydride), methylhexahydrophthalic anhydride (methylhexahydrophthalic acid anhydride), hexahydrophthalic anhydride (hexahydrophthalic acid anhydride), methylhimic anhydride, trialkyltetrahydrophthalic anhydride, methylcyclohexenedicarboxylic anhydride, methylcyclohexanetetracarboxylic anhydride, ethylene glycol bis(trimellitic dianhydride), het anhydride, nadic anhydride, methyl nadic anhydride, 5-(2,5-dioxotetrahydro-3-furanyl)-3-methyl-3-cyclohexane-1,2-dicarboxylic anhydride, 3,4-dicarboxy-1,2,3,4-tetrahydro-1-naphthalene succinic dianhydride, 1-methyl-dicarboxy-1,2,3,4-tetrahydro-1-naphthalene succinic dianhydride, glutaric anhydride, dimethylglutaric anhydride, diethylglutaric anhydride, and succinic anhydride.

Among these acid anhydride curing agents, phthalic anhydride, trimellitic anhydride, hexahydrophthalic anhydride, tetrahydrophthalic anhydride, methylhexahydrophthalic anhydride, methyltetrahydrophthalic anhydride, glutaric anhydride, dimethylglutaric anhydride, and diethylglutaric anhydride are preferably used.

Examples of modified acid anhydrides include products obtained by modifying the above-described acid anhydrides with glycols. Examples of glycols that can be used for the modification include alkylene glycols, such as ethylene glycol, propylene glycol, and neopentyl glycol, and polyether glycols, such as polyethylene glycols, polypropylene glycols, and polytetramethylene glycols. Furthermore, polyether glycol copolymers of two or more types of these glycols and/or polyether glycols can also be used.

For such a modified acid anhydride, it is preferable to modify 1 mol of an acid anhydride with 0.4 mol or less of a glycol. When the amount of modification is less than or equal to the above-mentioned upper limit, the epoxy resin composition does not have an excessively high viscosity and thus tends to have good workability, and the rate of the curing reaction with the epoxy resin also tends to be good.

These acid anhydride curing agents described above may be used alone or in combination of two or more in any combination and amount mixed.

When such an acid anhydride curing agent is used, the acid anhydride curing agent is preferably used in such a manner that the equivalent ratio of functional groups in the curing agent to epoxy groups in all epoxy resin components in the epoxy resin composition (B) is in the range of 0.8 to 1.5. Within this range, unreacted epoxy groups and functional groups of the curing agent are less likely to remain, which is preferred.

<Isocyanuric Acid Derivative Curing Agent>

Examples of the isocyanuric acid derivative curing agents include 1,3,5-tris(1-carboxymethyl) isocyanurate, 1,3,5-tris(2-carboxyethyl) isocyanurate, 1,3,5-tris(3-carboxypropyl) isocyanurate, and 1,3-bis(2-carboxyethyl) isocyanurate.

Among these isocyanuric acid derivative curing agents, 1,3,5-tris(3-carboxypropyl) isocyanurate is preferably used.

These isocyanuric acid derivative curing agents described above may be used alone or in combination of two or more in any combination and amount mixed.

When such an isocyanuric acid derivative curing agent is used, the acid anhydride curing agent is preferably used in such a manner that the equivalent ratio of functional groups in the curing agent to epoxy groups in all epoxy resin components in the epoxy resin composition (B) is in the range of 0.8 to 1.5. Within this range, unreacted epoxy groups and functional groups of the curing agent are less likely to remain, which is preferred.

<Phenolic Curing Agent>

Examples of the phenolic curing agents include novolac phenolic resins obtained by condensation or co-condensation of phenols, such as phenol, cresol, resorcinol, catechol, bisphenol A, bisphenol F, phenylphenol, and aminophenol, and/or naphthols, such as (α-naphthol, β-naphthol, and dihydroxynaphthalene, with aldehyde group-containing compounds, such as formaldehyde, benzaldehyde, and salicylaldehyde, in the presence of an acid catalyst; phenol-aralkyl resins synthesized from phenols and/or naphthols and dimethoxy-p-xylene or bis(methoxymethyl)biphenyl; aralkyl-type phenolic resins, such as biphenylene-type phenol-aralkyl resins and naphthol-aralkyl resins; dicyclopentadiene-type phenolic resins, such as dicyclopentadiene-type phenolic novolac resins and dicyclopentadiene-type naphthol novolac resins, synthesized by copolymerization of phenols and/or naphthols and dicyclopentadiene; triphenylmethane-type phenolic resins; terpene-modified phenolic resins; p-xylylene and/or m-xylylene-modified phenolic resins; melamine-modified phenolic resins; cyclopentadiene-modified phenolic resins; and phenolic resins obtained by copolymerization of two or more thereof.

The amount of the phenolic curing agent added is preferably 0.1 to 1,000 parts by mass, more preferably 500 parts or less by mass, even more preferably 300 parts or less by mass, particularly preferably 100 parts or less by mass, based on 100 parts by mass of all epoxy resin components in the epoxy resin composition (B).

<Amine Curing Agent>

Examples of the amine curing agents (excluding tertiary amines) include aliphatic amines, polyether amines, alicyclic amines, and aromatic amines.

Examples of aliphatic amines include ethylenediamine, 1,3-diaminopropane, 1,4-diaminopropane, hexamethylenediamine, 2,5-dimethylhexamethylenediamine, trimethylhexamethylenediamine, diethylenetriamine, iminobispropylamine, bis(hexamethylene)triamine, triethylenetetramine, tetraethylene pentamine, pentaethylene hexamine, N-hydroxyethylenediamine, and tetra(hydroxyethyl)ethylenediamine.

Examples of polyetheramines include triethylene glycol diamine, tetraethylene glycol diamine, diethylene glycol bis(propylamine), polyoxypropylene diamine, and polyoxypropylene triamine.

Examples of the alicyclic amines include isophoronediamine, methacenediamine, N-aminoethylpiperazine, bis(4-amino-3-methyldicyclohexyl)methane, bis(aminomethyl) cyclohexane, 3,9-bis(3-aminopropyl)-2,4,8,10-tetraoxaspiro (5,5)undecane, and norbornenediamine.

Examples of the aromatic amines include tetrachloro-p-xylylenediamine, m-xylylenediamine, p-xylylenediamine, m-phenylenediamine, o-phenylenediamine, p-phenylenediamine, 2,4-diaminoanisole, 2,4-toluenediamine, 2,4-diaminodiphenylmethane, 4,4'-diaminodiphenylmethane, 4,4'-diamino-1,2-diphenylethane, 2,4-diaminodiphenyl sulfone, 4,4'-diaminodiphenyl sulfone, m-aminophenol, m-aminobenzylamine, benzyldimethylamine, 2-(dimethylaminomethyl)phenol, triethanolamine, methylbenzylamine, α-(m-aminophenyl)ethylamine, α-(p-aminophenyl)ethylamine, diaminodiethyldimethyldiphenylmethane, and α,α'-bis(4-aminophenyl)-p-diisopropylbenzene.

These amine curing agents described above may be used alone or in combination of two or more in any combination and mixing ratio.

Such an amine curing agent is preferably used in such a manner that the equivalent ratio of functional groups in the curing agent to epoxy groups in all epoxy resin components in the epoxy resin composition (B) is in the range of 0.8 to 1.5. Within this range, unreacted epoxy groups and functional groups of the curing agent are less likely to remain, which is preferred.

Examples of the tertiary amines include 1,8-diazabicyclo (5,4,0)triethylenediamine7, triethylenediamine, benzyldimethylamine, triethanolamine, dimethylaminoethanol, tris(dimethylaminomethyl)phenol, and dimethylaminomethylphenol.

These tertiary amines described above may be used alone or in combination of two or more in any combination and mixing ratio.

Such a tertiary amine is preferably used in such a manner that the equivalent ratio of functional groups in the curing agent to epoxy groups in all epoxy resin components in the epoxy resin composition (B) is in the range of 0.8 to 1.5.

Within this range, unreacted epoxy groups and functional groups of the curing agent are less likely to remain, which is preferred.

<Amide Curing Agent>

Examples of the amide curing agents include dicyandiamide and derivatives thereof and polyamide resins.

The amide curing agents may be used alone or in combination of two or more in any combination and ratio.

When such an amide curing agent is used, the amide curing agent is preferably used in an amount of 0.1% to 20% by mass based on the total of all epoxy resin components in the epoxy resin composition (B) and the amide curing agent.

<Imidazoles>

Examples of the imidazoles include 2-phenylimidazole, 2-ethyl-4(5)-methylimidazole, 2-phenyl-4-methylimidazole, 1-benzyl-2-methylimidazole, 1-benzyl-2-phenylimidazole, 1-cyanoethyl-2-undecylimidazole, 1-cyano-2-phenylimidazole, 1-cyanoethyl-2-undecylimidazole trimellitate, 1-cyanoethyl-2-phenylimidazolium trimellitate, 2,4-diamino-6-[2'-methylimidazolyl-(1')]-ethyl-s-triazine, 2,4-diamino-6-[2'-ethyl-4'-methylimidazolyl-(1')]-ethyl-s-triazine, an isocyanuric acid adduct of 2,4-diamino-6-[2'-methylimidazolyl-(1')]-ethyl-s-triazine, an isocyanuric acid adduct of 2-phenylimidazole, 2-phenyl-4,5-dihydroxymethylimidazole, 2-phenyl-4-methyl-5-hydroxymethylimidazole, and adducts of epoxy resins and the above imidazoles.

Imidazoles can also be commonly classified as curing accelerators because of their catalytic ability. In this invention, however, they are classified as curing agents.

These imidazoles described above may be used alone or in combination of two or more in any combination and ratio.

When such an imidazole is used, the imidazole is preferably used in an amount of 0.1% to 20% by mass based on the total of all epoxy resin components in the epoxy resin composition (B) and the imidazole.

<Other Curing Agents>

In the epoxy resin composition (B) of the present invention, other curing agents can be used in addition to the curing agent. Other curing agents that can be used in the epoxy resin composition (B) of the present invention are not particularly limited. All curing agents that are commonly known as curing agents for epoxy resins can be used.

Other curing agents may be used alone or in combination of two or more.

[Other Epoxy Resins]

The epoxy resin composition (B) of the present invention can further contain other epoxy resins in addition to the epoxy resin composition (A) described above. The incorporation of other epoxy resins enables improvements in the heat resistance, stress resistance, moisture resistance, and flame retardancy of the epoxy resin composition (B) of the present invention.

Other epoxy resins that can be used in the epoxy resin composition (B) of the present invention are all epoxy resins other than the epoxy resins (mainly epoxy resins (1) to (3)) contained in the epoxy resin composition (A) described above.

Specific examples thereof include bisphenol A-type epoxy resins, trisphenol methane-type epoxy resins, anthracene-type epoxy resins, phenol-modified xylene resin-type epoxy resins, bisphenol cyclododecyl-type epoxy resins, bisphenol diisopropylidene resorcinol-type epoxy resins, bisphenol F-type epoxy resins, bisphenol AD-type epoxy resins, hydroquinone-type epoxy resins, methylhydroquinone-type epoxy resins, dibutylhydroquinone-type epoxy resins, resorcinol-type epoxy resins, methylresorcinol-type epoxy resins, biphenol-type epoxy resins, tetramethylbiphenol-type epoxy resins other than the epoxy resins (1) and (2) in the epoxy resin composition (A), tetramethylbisphenol F-type epoxy resins, dihydroxydiphenyl ether-type epoxy resins, epoxy resins derived from thiodiphenols, dihydroxynaphthalene-type epoxy resins, dihydroxyanthracene-type epoxy resins, dihydroxydihydroanthracene-type epoxy resins, dicyclopentadiene-type epoxy resins, epoxy resins derived from dihydroxystilbenes, phenol novolac-type epoxy resins, cresol novolac-type epoxy resins, bisphenol A-type novolac epoxy resins, naphthol novolac-type epoxy resins, phenol aralkyl-type epoxy resins, naphtholaralkyl-type epoxy resins, biphenylaralkyl-type epoxy resins, terpenephenol-type epoxy resins, dicyclopentadienephenol-type epoxy resins, epoxy resins derived from condensation products of phenol and hydroxybenzaldehyde, epoxy resins derived from condensation products of phenol and crotonaldehyde, epoxy resins derived from condensation products of phenol and glyoxal, epoxy resins derived from co-condensation resins of phenols and formaldehyde with heavy oils or pitches, epoxy resins derived from diaminodiphenylmethane, epoxy resins derived from aminophenols, epoxy resins derived from xylenediamines, epoxy resins derived from methylhexahydrophthalic acid, and epoxy resins derived from dimer acids.

These may be used alone or in combination of two or more in any combination and mixing ratio.

[Curing Accelerator]

The epoxy resin composition (B) of the present invention preferably contains a curing accelerator. The incorporation of the curing accelerator enables shortening of the curing time and lowering of the curing temperature, facilitating the production of the desired cured product.

Specific examples of the curing accelerator include, but are not limited to, phosphorus-containing compounds, such as organophosphines and phosphonium salts, tetraphenylboron salts, organic acid dihydrazides, and boron halide amine complexes.

Examples of phosphorus-containing compounds that can be used as curing accelerators include organophosphines, such as triphenylphosphine, diphenyl(p-tolyl)phosphine, tris(alkylphenyl)phosphine, tris(alkoxyphenyl)phosphine, tris(alkylalkoxyphenyl)phosphine, tris(dialkylphenyl)phosphine, tris(trialkylphenyl)phosphine, tris(tetraalkylphenyl)phosphine, tris(dialkoxyphenyl)phosphine, tris(trialkoxyphenyl)phosphine, tris(tetraalkoxyphenyl) phosphine, trialkylphosphines, dialkylarylphosphines, and alkyldiarylphosphines; complexes of these organophosphines with organoborons; and adduct compounds of these organophosphines and compounds such as maleic anhydride, quinone compounds, e.g., 1,4-benzoquinone, 2,5-toluquinone, 1,4-naphthoquinone, 2,3-dimethylbenzoquinone, 2,6-dimethylbenzoquinone, 2,3-dimethoxy-5-methyl-1,4-benzoquinone, 2,3-dimethoxy-1,4-benzoquinone, and phenyl-1,4-benzoquinone, and diazophenylmethane.

Among the above-mentioned curing accelerators, organophosphines and phosphonium salts are preferred. Organophosphines are most preferred.

A single type of curing accelerator among the above-mentioned curing accelerators may be used alone or in combination as a mixture of two or more in any combination and ratio.

The curing accelerator is preferably used in a range of 0.1 weight to 20 parts by mass, more preferably 0.5 parts or more by mass, even more preferably 1 part or more by mass, more preferably 15 parts or less by mass, even more preferably 10 parts or less by mass, based on 100 parts by mass of all epoxy resin components in the epoxy resin composition (B). When the curing accelerator content is more than or equal to the lower limit described above, a good curing acceleration effect can be provided. When the curing accelerator content is less than or equal to the above upper limit, the desired curing properties are easily obtained.

[Inorganic Filler]

The epoxy resin composition (B) of the present invention can be mixed with an inorganic filler. Examples of the inorganic filler include fused silica, crystalline silica, glass powders, alumina, calcium carbonate, calcium sulfate, talc, boron nitride, and titanium oxide. These may be used alone or in combination of two or more in any combination and mixing ratio.

When the inorganic filler is used in the epoxy resin composition (B) of the present invention, the inorganic filler is preferably mixed in the range of 60% to 95% by mass of the entire epoxy resin composition (B).

[Mold Release Agent]

The epoxy resin composition (B) of the present invention can be mixed with a mold release agent. Examples of the mold release agent that can be used include natural waxes, such as carnauba wax, synthetic waxes, such as polyethylene wax, higher fatty acids, such as stearic acid and zinc stearate, and metal salts thereof, and hydrocarbon mold release agents, such as paraffin. These may be used alone or in combination of two or more in any combination and mixing ratio.

When the epoxy resin composition (B) of the present invention is mixed with the mold release agent, the amount of the mold release agent mixed is preferably 0.1 to 5.0 parts by mass, more preferably 0.5 to 3.0 parts by mass, based on 100 parts by mass of all epoxy resin components in the epoxy resin composition (B). When the amount of the mold release agent mixed is within the above range, good releasability can be achieved while the curing properties of the epoxy resin composition (B) are maintained, which is preferred.

[Coupling Agent]

The epoxy resin composition (B) of the present invention is preferably mixed with a coupling agent. The coupling agent is preferably used in combination with the inorganic filler. The incorporation of the coupling agent enables an improvement in the adhesion between the epoxy resin serving as the matrix and the inorganic filler.

Examples of the coupling agent include silane coupling agents and titanate coupling agents.

Examples of the silane coupling agent include epoxy silanes, such as γ-glycidoxypropyltrimethoxysilane, γ-glycidoxypropyltriethoxysilane, and β-(3,4-epoxycyclohexyl)ethyltrimethoxysilane; aminosilanes, such as γ-aminopropyltriethoxysilane, N-β(aminoethyl)γ-aminopropyltrimethoxysilane, N-β(aminoethyl)γ-aminopropylmethyldimethoxysilane, γ-aminopropyltrimethoxysilane, and γ-ureidopropyltriethoxysilane; mercaptosilanes, such as 3-mercaptopropyltrimethoxysilane; vinylsilanes, such as p-styryltrimethoxysilane, vinyltrichlorosilane, vinyltris(β-methoxyethoxy)silane, vinyltrimethoxysilane, vinyltriethoxysilane, and γ-methacryloxypropyltrimethoxysilane; and epoxy, amino, and vinyl polymer-type silanes.

Examples of the titanate coupling agent include isopropyl triisostearoyl titanate, isopropyl tri(N-aminoethyl-aminoethyl) titanate, diisopropyl bis(dioctylphosphate) titanate, tetraisopropyl bis(dioctyl phosphite) titanate, tetraoctyl bis(ditridecylphosphite) titanate, tetra(2,2-diallyloxymethyl-1-butyl) bis(ditridecyl)phosphite titanate, bis(dioctylpyrophosphate) oxyacetate titanate, and bis(dioctylpyrophosphate) ethylene titanate.

These coupling agents may be used alone or in combination of two or more in any combination and ratio.

When the coupling agent is used for the epoxy resin composition (B) of the present invention, the amount of the coupling agent mixed is preferably 0.1 to 3.0 parts by mass based on 100% by mass of all epoxy resin components. When the amount of the coupling agent mixed is more than or equal to the lower limit described above, the effect of incorporating the coupling agent on an improvement in the adhesion between the epoxy resin serving as a matrix and the inorganic filler tends to be improved. When the amount of the coupling agent mixed is less than or equal to the upper limit described above, the coupling agent is less likely to bleed out from the resulting cured product.

[Other Mixing Components]

The epoxy resin composition (B) of the present invention can be mixed with components other than those described above (sometimes referred to as "other mixing components" in the present invention). Examples of other mixing components include flame retardants, plasticizers, reactive diluents, and pigments, which can be appropriately incorporated as needed. The incorporation of components other than those described above into the epoxy resin composition (B) of the present invention is not hindered.

Examples of the flame retardants used in the epoxy resin composition (B) of the present invention include halogenated flame retardants, such as brominated epoxy resins and brominated phenolic resins; antimony compounds, such as antimony trioxide; phosphorus flame retardants, such as red phosphorus, phosphates, and phosphines; nitrogen-containing flame retardants, such as melamine derivatives; and inorganic flame retardants, such as aluminum hydroxide and magnesium hydroxide.

[Cured Product]

The epoxy resin composition (B) of the present invention can be cured to produce a cured product of the present invention. The cured product of the present invention produced by curing the epoxy resin composition (B) of the present invention has superior properties in terms of curability, crack resistance, and heat resistance.

A method for curing the epoxy resin composition (B) of the present invention is not particularly limited. The cured product can be usually produced through a thermosetting reaction by heating. The curing temperature during the thermosetting reaction is preferably selected in accordance with the type of curing agent used, as appropriate. For example, when an acid anhydride curing agent is used, the curing temperature is usually 80° C. to 250° C. The addition of the curing accelerators to these curing agents can also reduce their curing temperatures.

The reaction time of the thermosetting reaction is preferably 1 to 20 hours, more preferably 2 to 18 hours, even more preferably 3 to 15 hours. At a reaction time of more than or equal to the lower limit described above, the curing reaction tends to proceed sufficiently, which is preferable. At a reaction time of less than or equal to the upper limit described above, a deterioration due to heating and energy loss during heating can be easily reduced, which is preferable.

The cured product produced from the epoxy resin composition (B) of the present invention has superior curability, crack resistance, and heat resistance.

The epoxy resin composition (B) of the present invention can preferably give a cured product in which when the gel time is measured at 120° C. with a No. 153 Gel Time Tester (magnetic type) available from Yasuda Seiki Seisakusho, Ltd., the measurement result is within 34 minutes. A shorter gel time of the cured product results in a shorter molding cycle to obtain the cured product, which is preferable.

The epoxy resin composition (B) of the present invention can preferably provide a cured product having specific properties described below. That is, the cured product is subjected to analysis with a thermo-mechanical analyzer (TMA, TMA/SS6100, available from Seiko Instruments Inc.) in compression mode. The first temperature increase is performed at 5° C./min (from 30° C. to 200° C.). The first temperature decrease is performed at 10° C./min (from 200° C. to 30° C.). The second temperature increase is performed at 5° C./min (from 30° C. to 200° C.). The glass transition temperature (Tg) and the coefficient of linear expansion (($\alpha$2) at Tg or higher at the second cycle are measured. The cured product has an coefficient of linear expansion (($\alpha$2) of 182 ppm or less and a glass transition temperature (Tg) of 125° C. or higher. A lower coefficient of linear expansion (($\alpha$2) of the cured product results in smaller thermal expansion at high temperatures, which is preferable because thermal stress is less likely to be caused and thus cracks are not easily formed. A higher glass transition temperature (Tg) results in smaller changes in physical properties, which is preferred.

[Applications]

The epoxy resin composition (A) of the present invention has superior electrical properties and optical properties. The epoxy resin composition (B) of the present invention containing the epoxy resin composition (A) of the present invention has superior curability. The cured product of the epoxy resin composition (B) of the present invention has superior crack resistance and heat resistance.

The epoxy resin composition (A) and the epoxy resin composition (B) and its cured product of the present invention can be effectively used in any application where these properties are required. They can be suitably used in any of the following applications: for example, optical materials; paint fields, such as electrodeposition paints for automobiles, heavy-duty anticorrosion paints for ships and bridges, and paints for coating the inner surface of beverage cans; electrical and electronic fields, such as laminates, semiconductor-encapsulating materials, insulating powder paints, and coil impregnation; civil engineering, construction, and adhesives fields, such as seismic reinforcement of bridges, concrete reinforcement, flooring materials for buildings, linings for water supply facilities, drainage and permeable pavement, and adhesives for vehicles and aircraft. Among these, they are particularly useful for electrical or electronic components and optical materials.

The epoxy resin composition (B) of the present invention may be cured and then used for the aforementioned applications, or may be cured in production processes for the aforementioned applications and then used.

EXAMPLES

While the present invention will be described in more detail with reference to examples, the present invention is not limited to the following examples as long as the gist thereof is not exceeded.

[Production and Evaluation of Epoxy Resin Composition (A)]

Examples 1 to 3 and Comparative Examples 1 to 7

Analytical methods and physical property measurement methods of the epoxy resin compositions produced in Examples 1 to 3 and Comparative Examples 1 to 7 are described below.

(1) Composition Analysis of Epoxy Resin Composition:

Under the following conditions, the area percentages of "epoxy resin (1)", "epoxy resin (2) and/or epoxy resin (3)," and "other components" of the epoxy resin compositions produced in examples and comparative examples were analyzed, and the mass percentages were calculated from the area percentages. The other components are epoxy resins other than the epoxy resins (1) to (3).

Instrument: Tosoh HLC-8220L GPC
Detector: RI
Mobile phase: Tetrahydrofuran (containing BHT)
Flor rate: 0.8 mL/min
Column: Tosoh TSKgel G2000Hxl+G1000Hxl×2
Column temperature: 40° C.

(2) Total Chlorine Content:

The total chlorine content was analyzed according to JIS K7243-3.

(3) Epoxy Equivalent:

The epoxy equivalent was analyzed according to JIS K7236-1955.

(4) Hazen Color Number:

The Hazen color number was analyzed with a UV-visible spectrophotometer according to ISO 6271-2:2004.

Example 1

First, 1,000 g of a Mitsubishi Chemical Corporation "jER828EL" bisphenol A-type epoxy resin (where in formula (4), X=isopropylidene group, $R^1$=hydrogen atom, n=0, epoxy equivalent=186 g/equivalent, and total chlorine content=1,300 ppm) was distilled with a centrifugal thin-film distillation apparatus at a temperature of 220° C. and a reduced pressure of 0.003 Torr to recover a fraction of 50% (500 g) over 6 hours, thereby providing a distilled bisphenol A-type epoxy resin (epoxy equivalent=171 g/equivalent, and total chlorine content=800 ppm).

In a 1-L induction stirring autoclave, 400 g of the resulting distilled bisphenol A-type epoxy resin (epoxy equivalent=171 g/equivalent, and total chlorine content=800 ppm), 100 g of ethyl acetate, and 2.4 g of a 5% by mass rhodium/graphite catalyst (N.E. CHEMCAT Corporation) as a hydrogenation catalyst were placed. The autoclave was purged with nitrogen and then hydrogen. The hydrogenation reaction was conducted at 110° C. and a hydrogen pressure of 8 MPa until almost no hydrogen absorption occurred. The reaction time was 180 minutes.

The hydrogenation catalyst was removed from the reaction solution by filtration with 5C filter paper.

Then the reaction solvent was removed at 100° C. under reduced pressure while nitrogen was blown at a low flow rate, thereby providing an epoxy resin composition (A) of Example 1.

Example 2

An epoxy resin composition (A) of Example 2 was produced as in Example 1, except that the amount of the hydrogenation catalyst was 1.2 g and the hydrogenation reaction time was 360 minutes.

Example 3

An epoxy resin composition (A) of Example 3 was produced as in Example 1, except that the amount of the hydrogenation catalyst was 4.8 g and the hydrogenation reaction time was 90 minutes.

In Comparative example 1, the reaction was conducted in accordance with Example 1 described in JP2002-97251A.

Comparative Example 1

In a 500-ml stainless steel autoclave equipped with an electromagnetic stirrer, 40 g of "Epotohto YD-8125" bisphenol A diglycidyl ether (epoxy equivalent=172 g/equivalent, available from Tohto Kasei Co. Ltd.), 120 g of propylene glycol monomethyl ether, and 1.0 g of a 5% by mass rhodium/graphite catalyst (N.E. CHEMCAT Corporation) were placed. The system was purged with hydrogen. Hydrogenation was then conducted at 50° C. and a hydrogen pressure of 4.9 MPa (50 kg/cm$^2$) for 5 hours under stirring.

After the completion of the reaction, the catalyst was removed by filtration. The solvent was removed at 150° C. and 266 Pa (20 Torr) to give an epoxy resin composition of Comparative example 1.

In Comparative examples 2 to 4 below, the reactions were conducted in accordance with Hydrogenation examples 5, 6, and 7 using catalysts produced in accordance with Examples described in Japanese Unexamined Patent Application Publication (Translation of PCT Application) No. JP2007-515276.

Comparative Example 2

In a 1.2-L pressure-resistant autoclave equipped with a gas supply tube (700 rpm) and a sampling tube, 21 g of catalyst (Catalyst D, Ru content: 1.7% by mass) was packed in a catalyst cage, heated to 50° C. along with 600 g of a 40% by mass solution of low-oligomeric bisphenol A bisglycidyl ether (distilled product, EEW=171 g/equivalent) in THF containing 4.5% by mass water, and hydrogenated at a hydrogen pressure of 250 bar. After a reaction time of 24 hours, the autoclave was cooled to room temperature and depressurized. The reaction batch was then removed. Fine fragments that had been mechanically abraded from the catalyst were separated off by means of a filter. An aliquot of the colorless reaction product was subjected to solvent removal with a rotary evaporator (conditions: oil bath temperature: 130° C., vacuum: 5 to 10 mbar, 15 minutes) to give an epoxy resin composition of Comparative example 2.

Comparative Example 3

In a 1.2-L pressure-resistant autoclave equipped with a gas supply tube (700 rpm) and a sampling tube, 21 g of catalyst (Catalyst D, Ru content: 2.0% by mass) was packed in a catalyst cage, heated to 50° C. along with 600 g of a 40% by mass solution of low-oligomer bisphenol A bisglycidyl ether (distilled product, EEW=171 g/equivalent) in THF containing 4.5% by mass water, and hydrogenated at a hydrogen pressure of 250 bar. After a reaction time of 11 hours, the conversion of the aromatic was complete according to $^1$H-NMR. The autoclave was cooled to room temperature and depressurized. The reaction batch was then removed. Fine fragments that had been mechanically abraded from the catalyst were separated off by means of a filter. An aliquot of the colorless reaction product was subjected to solvent removal with a rotary evaporator (conditions: oil bath temperature: 130° C., vacuum: 5 to 10 mbar, 15 minutes) to give an epoxy resin composition of Comparative example 3.

Comparative Example 4

In a 1.2-L pressure-resistant autoclave equipped with a gas supply tube (700 rpm) and a sampling tube, 17.9 g of catalyst (Catalyst D, Ru content: 2.0% by mass) was packed in a catalyst cage, heated to 50° C. along with 600 g of a 40% by mass solution of low-oligomer bisphenol A bisglycidyl ether (distilled product, EEW=171 g/equivalent) in THF containing 4.5% by mass water, and hydrogenated at a hydrogen pressure of 250 bar. After a reaction time of 14 hours, the conversion of the aromatic was complete according to $^1$H-NMR. The autoclave was cooled to room temperature and depressurized. The reaction batch was then removed. Fine fragments that had been mechanically abraded from the catalyst were separated off by means of a filter. An aliquot of the colorless reaction product was subjected to solvent removal with a rotary evaporator (conditions: oil bath temperature: 130° C., vacuum: 5 to 10 mbar, 15 minutes) to give an epoxy resin composition of Comparative example 4.

In Comparative examples 5 and 6 below, the reactions were conducted in accordance with Example 1 described in JP11-269159A.

Comparative Example 5

In a four-necked flask equipped with a rotary stirrer, a decanter, a thermometer, and a gas inlet, 1,215 g (5 mol) of hydrogenated bisphenol A, 580 g of xylene, and 15 g of tin(IV) chloride pentahydrate were placed. After 1,110 g (12 mol) of epichlorohydrin was added dropwise at 100° C. over 60 minutes, stirring was continued for another 30 minutes to complete the addition reaction. Then, 35 g of benzyltrimethylammonium chloride and 1,130 g of a 50% aqueous sodium hydroxide solution were added to the mixture, followed by stirring at 80° C. for 5 hours to complete the ring-closing reaction. Sodium chloride formed as a by-product and unreacted sodium hydroxide were removed by washing with water. The water and solvent in the reaction mixture were removed at 120° C. and 3 Torr for 1 hour to give 1,860 g of a crude product (crude reaction product-A). Then, 2 g of 2,6-di-tert-butyl-4-methylphenol serving as an antioxidant was dissolved in the above crude reaction product. A centrifugal molecular distillation apparatus (Model MS-150 molecular distillation apparatus, available from Nippon Sharyo Co., Ltd.) with an evaporation surface diameter of 150 mm and a residence time of 1 second or less for the treatment liquid was used. The liquid was circulated for 1 hour at a feed rate of 3 L/h at 70° C. After that, the operating conditions were adjusted to a vacuum of 0.005 Torr, a feed rate of 1.5 L/h, and an evaporation surface temperature of 135° C. Here, 5% by mass of the fore-running relative to the amount of liquid fed was steadily distilled off to give an epoxy resin composition of Comparative example 5.

Comparative Example 6

An epoxy resin composition of Comparative example 6 was produced as in Comparative example 5, except that in the distillation with the centrifugal molecular distillation apparatus (Model MS-150 molecular distillation apparatus, available from Nippon Sharyo Co., Ltd.), 5% by mass of the fore-running was changed to 1% by mass relative to the amount of liquid fed.

In Comparative example 7, the reaction was conducted in accordance with Example 1 described in JP2003-212955A.

Comparative Example 7

In a 1-L induction stirring autoclave, 400 g of a Mitsubishi Chemical Corporation "jER828EL" bisphenol A-type epoxy resin (epoxy equivalent=186 g/equivalent), 100 g of ethyl acetate, and 2.4 g of a 5% by mass rhodium/graphite catalyst (N.E. CHEMCAT Corporation) as a hydrogenation catalyst were placed. The autoclave was purged with nitrogen and then hydrogen. The hydrogenation reaction was conducted at 110° C. and a hydrogen pressure of 8 MPa until almost no hydrogen absorption occurred. The reaction time was 180 minutes.

The hydrogenation catalyst was removed from the reaction solution by filtration with 5C filter paper. Then the reaction solvent was removed at 100° C. under reduced pressure while nitrogen was blown at a low flow rate, thereby providing an epoxy resin composition of Comparative example 7.

Table 1 (Table 1A and Table 1B) presents the analytical results of the epoxy resin compositions obtained in Examples 1 to 3 and Comparative examples 1 to 7.

TABLE 1A

| | | | Example | | |
|---|---|---|---|---|---|
| | | | 1 | 2 | 3 |
| Composition of epoxy resin composition (A) | Epoxy resin (1) [% by mass] | | 95.0 | 90.0 | 98.0 |
| | Total of epoxy resin (2) and epoxy resin (3) [% by mass] | | 5.0 | 10.0 | 2.0 |
| | Other components [% by mass] | | 0 | 0 | 0 |
| | Proportion of epoxy resins (2)·(3)/epoxy resin (1) [% by mass] | | 5.2 | 11.1 | 2.0 |
| Total chlorine content [ppm] | | | 700 | 750 | 700 |
| Epoxy equivalent [g/equivalent] | | | 181 | 186 | 178 |
| Hazen color number [—] | | | 8 | 9 | 7 |

TABLE 1B

| | | Comparative example | | | | | | |
|---|---|---|---|---|---|---|---|---|
| | | 1 | 2 | 3 | 4 | 5 | 6 | 7 |
| Composition of epoxy resin composition | Epoxy resin (1) [% by mass] | 87.0 | 70.0 | 71.0 | 65.0 | 60.0 | 62.0 | 75.0 |
| | Total of epoxy resin (2) and epoxy resin (3) [% by mass] | 13.0 | 30.0 | 29.0 | 35.0 | 0.0 | 0.0 | 15.0 |

TABLE 1B-continued

|  | Comparative example | | | | | | |
|---|---|---|---|---|---|---|---|
|  | 1 | 2 | 3 | 4 | 5 | 6 | 7 |
| Other components [% by mass] | 0 | 0 | 0 | 0 | 40.0 | 38.0 | 10.0 |
| Proportion of epoxy resins (2) · (3)/epoxy resin (1) [% by mass] | 14.9 | 42.8 | 40.8 | 53.8 | 0 | 0 | 20.0 |
| Total chlorine content [ppm] | 700 | 700 | 700 | 700 | >5000 | >5000 | 1200 |
| Epoxy equivalent [g/ equivalent] | 190 | 207 | 208 | 215 | 213 | 214 | 200 |
| Hazen color number [-] | 15 | 13 | 13 | 13 | 10 | 10 | 15 |

[Production of Epoxy Resin Composition (B) and Evaluation of Cured Product]

Comparative Example 4 to 6 and Comparative Examples 8 to 14

The evaluation methods for the epoxy resin compositions obtained in Examples 4 to 6 and Comparative examples 8 to 14 and their cured products are described below.

(1) Gel Time at 120° C.:

The gel time of each of the uniformly mixed epoxy resin compositions having formulations given in Table 2 (Table 2A and Table 2B) was measured with a No. 153 Gel Time Tester (magnetic type) available from Yasuda Seiki Seisakusho, Ltd.

The following were used as a curing agent and a curing accelerator.

Curing agent: "Rikacid MH-700" (4-methylhexahydrophthalic anhydride/hexahydrophthalic anhydride=70/30) available from New Japan Chemical Co., Ltd.

Curing accelerator: "Hishicolin PX-4MP" (methyltributylphosphonium dimethylphosphate) available from Nippon Chemical Industrial Co., Ltd.

(2) α2 (Coefficient of Linear Expansion at Tg or Higher) and Tg (Glass Transition Temperature) (TMA):

Two glass plates each having a mold release PET film attached were provided. A mold was formed by adjusting the spacing between the glass plates to 4 mm with the two mold release PET films facing inward.

Each of the uniformly mixed epoxy resin compositions having the formulations given in Table 2 (Table 2A and Table 2B) was poured into this mold. The composition was heated at 100° C. for 3 hours and then at 130° C. for 3 hours to produce a cured product.

The resulting cured product was cut into a cylindrical shape with a diameter of 1 cm and a thickness of 4 mm to produce a test piece.

The test piece was subjected to analysis with a thermo-mechanical analyzer (TMA, TMA/SS6100, available from Seiko Instruments Inc.) in compression mode. The first temperature increase was performed at 5° C./min (from 30° C. to 200° C.). The first temperature decrease was performed at 10° C./min (from 200° C. to 30° C.). The second temperature increase was performed at 5° C./min (from 30° C. to 200° C.). α2 and Tg were measured at the second cycle.

Table 2 (Table 2A and Table 2B) presents the evaluation results.

TABLE 2A

|  |  |  | Example | | |
|---|---|---|---|---|---|
|  |  |  | 4 | 5 | 6 |
| Formulation of epoxy resin composition (B) | Epoxy resin composition (A) of Example 1 | parts by mass | 100 | | |
|  | Epoxy resin composition (A) of Example 2 | parts by mass |  | 100 | |
|  | Epoxy resin composition (A) of Example 3 | parts by mass |  |  | 100 |
|  | Curing agent | parts by mass | 91 | 89 | 93 |
|  | Curing accelerator | parts by mass | 1 | 1 | 1 |
| Gel time (120° C.) |  | minutes | 32 | 34 | 30 |
| TMA | α2 | ppm | 175 | 182 | 173 |
|  | Tg | ° C. | 130 | 125 | 133 |

TABLE 2B

|  |  |  | Comparative example | | | | | | |
|---|---|---|---|---|---|---|---|---|---|
|  |  |  | 8 | 9 | 10 | 11 | 12 | 13 | 14 |
| Formulation of epoxy resin composition | Epoxy resin composition of Comparative example 1 | parts by mass | 100 | | | | | | |
|  | Epoxy resin composition of Comparative example 2 | parts by mass |  | 100 | | | | | |
|  | Epoxy resin composition of Comparative example 3 | parts by mass |  |  | 100 | | | | |
|  | Epoxy resin composition of Comparative example 4 | parts by mass |  |  |  | 100 | | | |

TABLE 2B-continued

|  |  |  | Comparative example | | | | | | |
|---|---|---|---|---|---|---|---|---|---|
|  |  |  | 8 | 9 | 10 | 11 | 12 | 13 | 14 |
|  | Epoxy resin composition of Comparative example 5 | parts by mass |  |  |  |  | 100 |  |  |
|  | Epoxy resin composition of Comparative example 6 | parts by mass |  |  |  |  |  | 100 |  |
|  | Epoxy resin composition of Comparative example 7 | parts by mass |  |  |  |  |  |  | 100 |
|  | Curing agent | parts by mass | 87 | 80 | 79 | 77 | 77 | 77 | 80 |
|  | Curing accelerator | parts by mass | 1 | 1 | 1 | 1 | 1 | 1 | 1 |
|  | Gel time (120° C.) | minutes | 35 | 40 | 40 | 38 | 36 | 38 | 35 |
| TMA | α2 | ppm | 188 | 202 | 202 | 209 | 208 | 206 | 188 |
|  | Tg | ° C. | 120 | 115 | 115 | 110 | 110 | 112 | 120 |

[Evaluation of Results]

Table 1 indicates that each of the epoxy resin compositions (A) of Examples 1 to 3, in which the compositions of the epoxy resins (1) to (3) are within the specified ranges of the present invention, has a low total chlorine content and thus superior electrical reliability and has a low Hazen color number and thus is superior as an optical material, compared with the epoxy resin compositions of Comparative examples 1 to 7.

Table 2 indicates that the cured products of the epoxy resin compositions (B) of Examples 4 to 6 containing the epoxy resin compositions (A) of Examples 1 to 3 have superior curability, low linear expansion, and heat resistance, compared with the cured products of the epoxy resins of Comparative examples 8 to 14.

Taken together, it can be seen that the epoxy resin compositions (A) of Examples 1 to 3 and the epoxy resin compositions (B) of Examples 4 to 6 are superior to the epoxy resin compositions of Comparative examples 1 to 7 and Comparative examples 8 to 14.

The present invention has been described in detail with reference to specific aspects. However, it will be understood by a person skilled in the art that various modifications can be made without departing from the spirit and scope of the invention.

The present invention contains subject matter related to Japanese Patent Application No. 2019-152125 filed on Aug. 22, 2019, the entire contents of which are incorporated herein by reference.

The invention claimed is:

1. An epoxy resin composition (A), comprising:
   89.0% to 99.9% by mass of an epoxy resin (1) having a structure represented by formula (1) and
   0.1% to 11.0% by mass of an epoxy resin (2) having a structure represented by formula (2) and/or
   an epoxy resin (3) having a structure represented by formula (3), each mass percent relative to 100% by mass of a total of the epoxy resin (1) and the epoxy resin (2) and/or the epoxy resin (3),

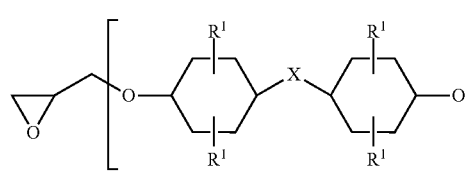

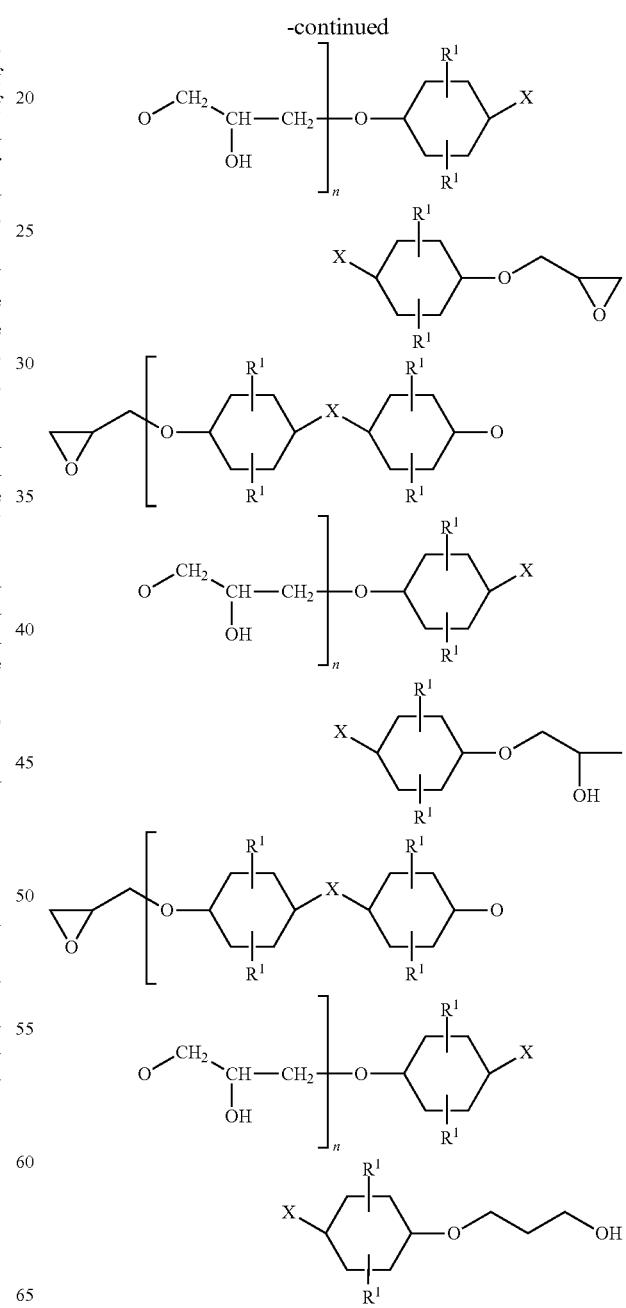

wherein in formulae (1), (2), and (3):

each X is independently a direct bond or a divalent linking group selected from the group consisting of $-SO_2-$, $-O-$, $-CO-$, $-C(CF_3)_2-$, $-S-$, and a hydrocarbon group having 1 to 20 carbon atoms, each $R^1$ is independently selected from the group consisting of a hydrogen atom, a hydrocarbon group having 1 to 10 carbon atoms, a halogen element, and a ring structure having 4 to 20 carbon atoms formed with two $R^1$ groups on adjacent carbon atoms of the cyclohexane ring, n is an integer of 0 to 2, and wherein an epoxy equivalent of the epoxy resin composition (A) is 176 to 186 g/equivalent.

2. The epoxy resin composition (A) according to claim 1, wherein in formulae (1) to (3), each X is an isopropylidene group, each $R^1$ is a hydrogen atom, and n is 0.

3. The epoxy resin composition (A) according to claim 1, wherein a total chlorine content is 1,000 ppm or less.

4. The epoxy resin composition (A) according to claim 1, wherein a value of a Hazen color number is 12 or less.

5. An epoxy resin composition (B), comprising:
   100 parts by mass of the epoxy resin composition (A) according to claim 1, and
   0.01 to 1,000 parts by mass of a curing agent.

6. A cured product obtained by curing the epoxy resin composition (B) according to claim 5.

7. An electrical or electronic component obtained by curing the epoxy resin composition (B) according to claim 5.

8. An optical component obtained by curing the epoxy resin composition (B) according to claim 5.

* * * * *